US007941532B2

(12) United States Patent
Ikenaga et al.

(10) Patent No.: US 7,941,532 B2
(45) Date of Patent: *May 10, 2011

(54) METHOD AND APPARATUS FOR CONDUCTING A TRANSACTION BETWEEN TRANSACTION PROCESSING SYSTEMS

(75) Inventors: Eri Ikenaga, Yokohama (JP); Masahiro Tsumura, Zama (JP); Kouichi Ookura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/542,948

(22) Filed: Aug. 18, 2009

(65) Prior Publication Data

US 2009/0307301 A1 Dec. 10, 2009

Related U.S. Application Data

(63) Continuation of application No. 12/007,192, filed on Jan. 8, 2008, now Pat. No. 7,668,955, which is a continuation of application No. 10/697,701, filed on Oct. 31, 2003, now Pat. No. 7,340,516.

(30) Foreign Application Priority Data

Mar. 28, 2003 (JP) ................................. 2003-092269

(51) Int. Cl.
*G06F 15/16* (2006.01)
*G06F 15/173* (2006.01)

(52) U.S. Cl. ........ 709/224; 709/203; 709/217; 709/218; 709/226

(58) Field of Classification Search .................. 709/203, 709/217, 220, 224; 705/39, 45, 60
See application file for complete search history.

(56) References Cited

U.S. PATENT DOCUMENTS

| 6,269,348 | B1 | 7/2001 | Pare et al. | |
| 6,275,831 | B1 * | 8/2001 | Bodnar et al. | 709/220 |
| 6,285,990 | B1 | 9/2001 | Lee et al. | |
| 6,321,263 | B1 | 11/2001 | Luzzi et al. | |
| 2002/0116082 | A1 * | 8/2002 | Gudorf | 709/217 |
| 2003/0130950 | A1 * | 7/2003 | Ahles | 705/45 |
| 2003/0194991 | A1 | 10/2003 | Gilmour | |

FOREIGN PATENT DOCUMENTS

| JP | 2002-324001 | 8/2002 |
| JP | 2002-324001 | * 11/2002 |

* cited by examiner

*Primary Examiner* — Quang N. Nguyen
(74) *Attorney, Agent, or Firm* — McDermott Will & Emery LLP

(57) ABSTRACT

When investigating a failure occurring in a transaction between information processing apparatuses, it is possible to reduce the time required for the failure investigation. A first local ID for identifying a transaction processing of first information processing apparatus is related with a standard ID for relating transaction processing of the first and the second information processing apparatuses with each other the related IDs and are stored in a first mapping table. The standard ID and a transaction processing request are transmitted to the second information processing apparatus to request execution of a transaction processing therefor. If a failure occurs in the requested transaction processing, a standard ID of the transaction processing concerned is specified to inquire a second local ID for identifying the transaction processing. Mapping information for relating the first local ID corresponding to the specified standard ID with the transmitted second local ID is generated.

6 Claims, 11 Drawing Sheets format ID : FORMAT ID
gtrid_length : GLOBAL TRANSACTION IDENTIFIER SIZE
bqual_length : BRANCH MODIFIER SIZE
data : GLOBAL TRANSACTION MODIFIER + BRANCH MODIFIER

METHOD AND APPARATUS FOR CONDUCTING A TRANSACTION BETWEEN TRANSACTION PROCESSING SYSTEMS

RELATED APPLICATIONS

This application is a Continuation of U.S. application Ser. No. 12/007,192, filed Jan. 8, 2008, now U.S. Pat. No. 7,668,955, which is a Continuation of U.S. application Ser. No. 10/697,701, filed Oct. 31, 2003, now U.S. Pat. No. 7,340,516, claiming priority of Japanese Application No. 2003-092269, filed Mar. 28, 2003, the entire contents of each of which are hereby incorporated by reference.

BACKGROUND OF THE INVENTION

The present invention relates to a technique which can be preferably applied to a transaction processing system for conducting a transaction between a plurality of information processing devices.

Currently, the transaction processing system is used in various works. For example, the transaction processing system is used in plenty of works including banking work and reservation work in a travel agent. Moreover, these transaction processing systems are linked to other transaction processing systems. For example, when drawing a deposit from bank A and transferring it to bank B, the transaction to update an account database of bank A is linked to the transaction to update an account database of bank B.

When transactions are linked between systems as has been described above, a transaction ID (local ID) managed in each system is different in most cases and accordingly, it is necessary to use an ID which can be recognized by each other (ID generated according to a predetermined specification will be referred to as a standard ID) in order to link the transactions between the systems. The standard ID is in a standard format common to the systems and defined by the standardization group or the like.

When a plurality of transactions are linked between systems by using the aforementioned standard ID, if any failure occurs in one of the transactions, the system detects the failure and records failure information. The failure information includes the local ID of the system but may not include the standard ID used when linked. When a failure occurs, the entry relating the standard ID to the local ID in a correspondence table is deleted and the failure investigation often requires a plenty of time.

It should be noted that for processing information by linking a plurality of information processing systems, there has been suggested a method for assuring information processing trace capable of assuring trace of each information processing (for example, see JP-A-2002-324001.

SUMMARY OF THE INVENTION

As has been described above, in the conventional transaction processing system, if a failure occurs in transaction processing performed by linking systems, the information relating a standard ID to a local ID is deleted and failure investigation requires a plenty of time.

It is therefore an object of the present invention to provide a technique to reduce the time required for failure investigation for investigating a failure which has occurred in the transaction processing performed between a plurality of information processing devices.

It is another object of the present invention to provide a method and an apparatus for outputting information on a transaction processing related to a failure in real time upon occurrence of the failure.

An aspect of the invention relates to a system comprising a plurality of information processing devices in which local identifiers (IDs) are exchanged between the plurality of information processing devices using standard IDs. When a failure happens during linking of transaction processings between the information processing devices, mapping information is generated for relating the local IDs of the information processing devices with each other without a search device that is required in the conventional art.

The present invention relates to a transaction processing system for conducting a transaction between a plurality of information processing devices, wherein if a failure occurs during a transaction processing, the standard ID and the local ID are held for a predetermined period of time so as to generate mapping information for relating the local ID in each of the information processing devices.

It is another object of the present invention to provide a method and an apparatus for outputting information on a transaction processing related to a failure in real time upon occurrence of the failure.

An aspect of the invention relates to a system comprising a plurality of information processing devices in which local identifiers (IDs) are exchanged between the plurality of information processing devices using standard IDs. When a failure happens during linking of transaction processings between the information processing devices, mapping information is generated for relating the local IDs of the information processing devices with each other without a search device that is required in the conventional art.

In the transaction processing system of the present invention, if a transaction processing started in a first information processing device requires a transaction processing in a second information processing device, firstly a standard ID is generated for relating the transaction processing in the first information processing device to a transaction processing in the second information processing device, after which a first local ID for identifying the transaction of the first information processing device is correlated with the aforementioned standard ID generated and the correlated ID's are stored in a first mapping table.

Next, the standard ID and a transaction processing request are transmitted to the second information processing device to request execution of the transaction processing in the second information processing device.

Upon reception of the standard ID and the transaction processing request from the first information processing device, the second information processing device generates a second local ID for identifying the transaction processing of the second information processing device, relates the received standard ID to the generated second local ID, stores them in a second mapping table, and executes the requested transaction processing.

If a failure occurs in the transaction processing being executed in the second information processing device, information on the time when the failure occurred is stored in a record in the second mapping table relating the standard ID of the transaction processing to the second local ID. The record is maintained for a predetermined period of time and occurrence of failure is notified to the first information processing device which has requested the execution.

Upon reception of a notification of occurrence of failure together with the standard ID from the second information processing device, the first information processing device specifies the standard ID and inquires about the second local ID of the transaction processing.

Upon reception of the inquiry with specification of the standard ID from the first information processing device, the second information processing device reads out the second local ID corresponding to the specified standard ID from the second mapping table and transmits it to the first information processing device.

The first information processing device receives the second local ID transmitted from the second information processing device and reads out the first local ID corresponding to the specified standard ID from the first mapping table so as to generate mapping information relating the first local ID to the transmitted second local ID.

When investigating the failure which has occurred, failure information on the first information processing device is collected by using the first local ID and then failure information on the second information processing device is collected by using the second local ID related to the first local ID in the mapping information, thereby reducing the time required for investigation because the standard ID need not be investigated. Moreover, since the mapping information relates the first local ID to the second local ID, it is possible to remove the work required for matching the local ID's.

As has been described above, in the transaction processing system of the present invention, when a failure occurs during a transaction processing linked with another transaction processing, the standard ID and the local ID are maintained for a predetermined period of time so as to generate mapping information relating the local IDs in the respective information processing devices with each other. Accordingly, it is possible to reduce the time required for investigating a failure which has occurred during a transaction processing conducted between a plurality of information processing devices.

Other objects, features and advantages of the invention will become apparent from the following description of the embodiments of the invention taken in conjunction with the accompanying drawings.

DESCRIPTION OF THE EMBODIMENTS

Description will now be directed to a transaction processing system for conducting a transaction processing between a plurality of information processing devices according to an embodiment.

Figure 1:
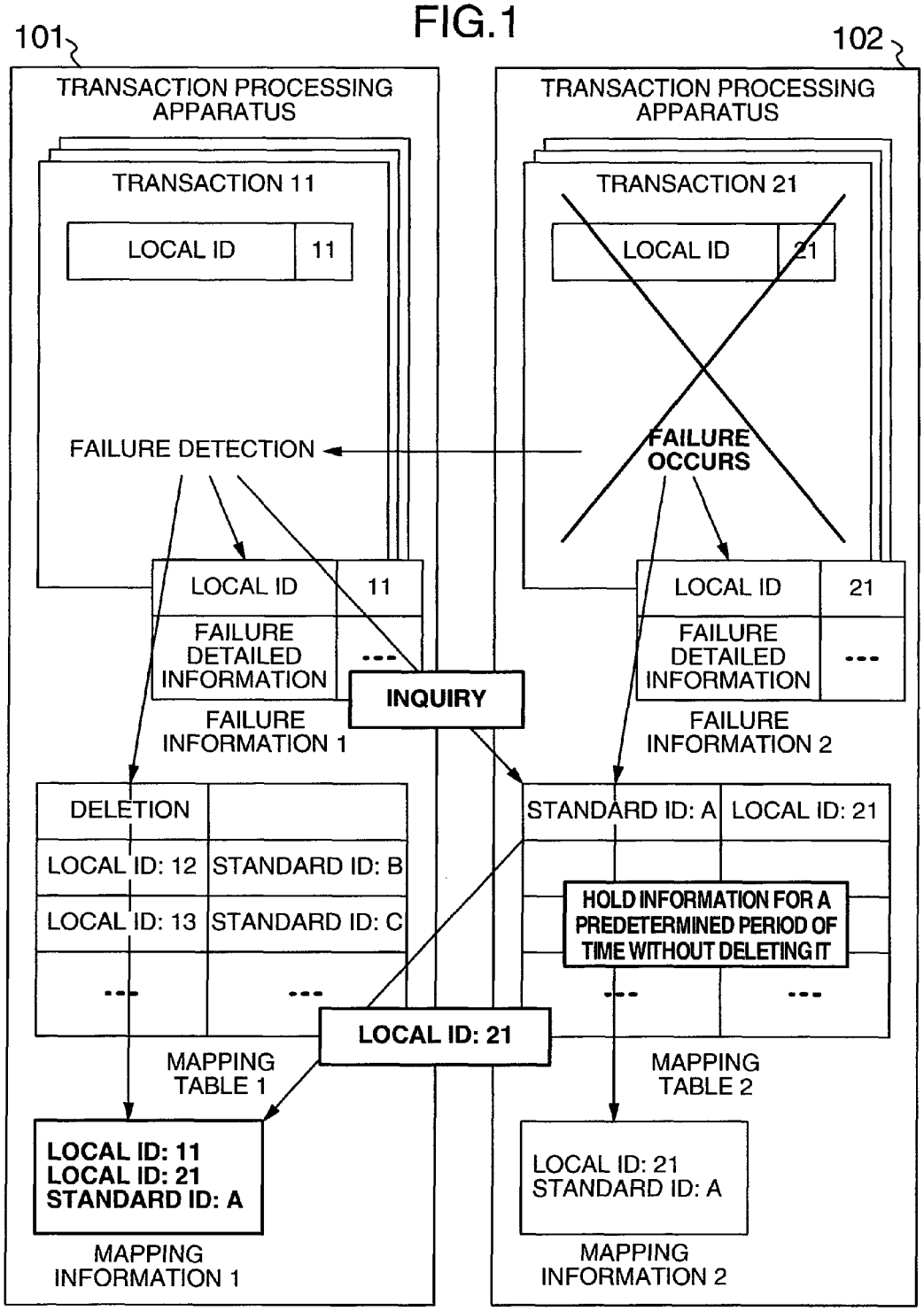
FIG. 1 shows brief configuration of a transaction processing system according to an embodiment of the present invention.

FIG. 1 shows brief configuration of a transaction processing system according to the embodiment. Transaction processing apparatuses 101 and 102 are computers or information processing devices where a transaction management program is executed. A transaction 11 and a transaction 21 in FIG. 1 represent business application programs.

As shown in FIG. 1, in the transaction processing system according to the present embodiment, transactions 11 and 21 are linked between a plurality of transaction processing apparatuses 101 and 102. When a failure occurs in the transaction 21, its standard ID "A" and the local ID "21" (the local ID represents 21 of the transaction ID) are maintained in a mapping table 2 until a predetermined period of time elapses. Upon reception of an inquiry from the transaction processing apparatus 101, the local ID "21" is transmitted to the transaction processing apparatus 101 so as to generate mapping information 1 for relating or corresponding the local ID "11" to the local ID "21".

When investigating the failure generated during linkage of the transactions, failure information 1 on the transaction processing apparatus 101 is collected by using the local ID "11" and then failure information 2 on the transaction processing apparatus 102 is collected by using the local ID "21" in the mapping information, thereby eliminating the investigation on the standard ID "A", which reduces the time required for failure investigation.

Figure 2:
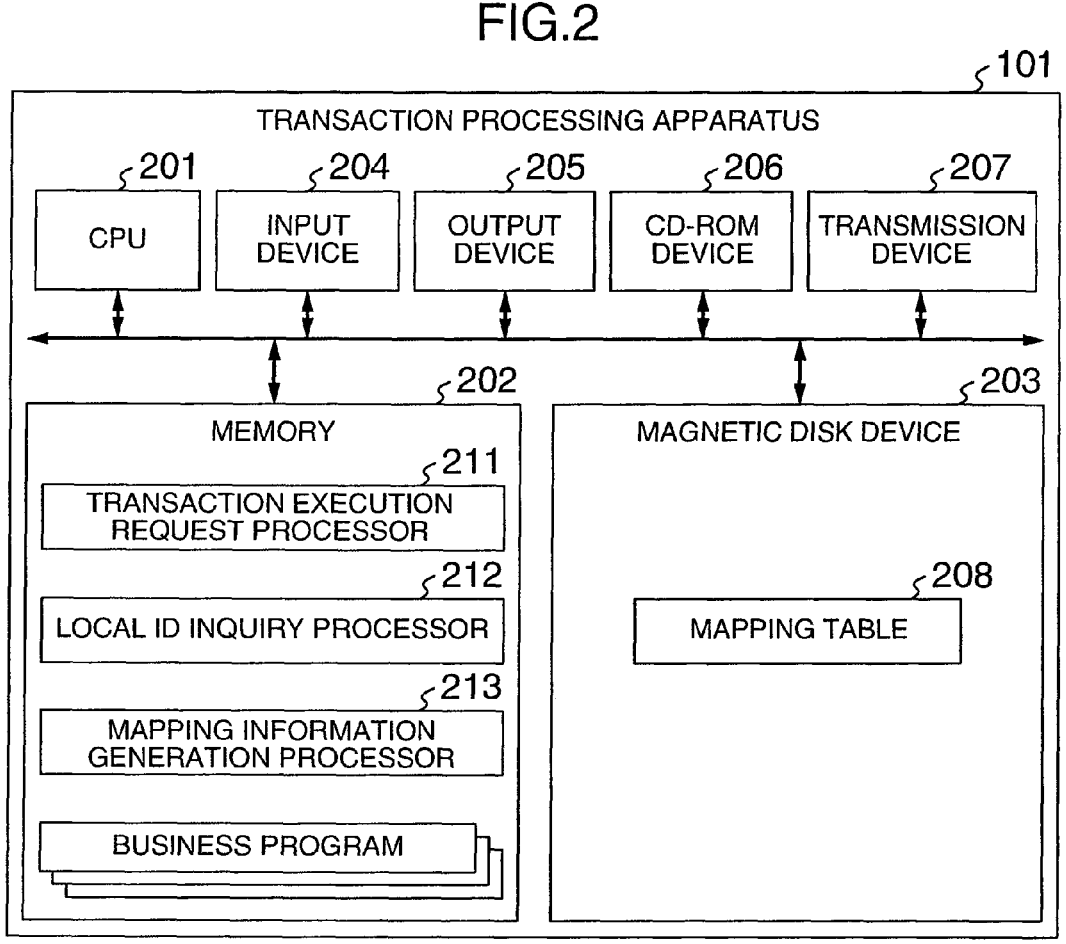
FIG. 2 shows brief configuration of a transaction processing apparatus 101 according to the present embodiment.

FIG. 2 shows a brief configuration of the transaction processing apparatus 101 according to the present embodiment. As shown in FIG. 2, the transaction processing apparatus 101 of the present embodiment includes a CPU 201, a memory 202, a magnetic disk device 203, an input device 204, and output device 205, a CD-ROM device 206, a communication device 207, and a mapping table 208.

The CPU 201 is an apparatus for controlling the operation of the entire transaction processing apparatus 101. The memory 202 is a storage device for loading various processing programs and data used for controlling the operation of the entire transaction processing apparatus 101.

The magnetic disk device 203 is a storage device for storing the aforementioned various processing programs and data. The input device 204 is a device for inputting various data for generating mapping information correlating the local ID of the self-apparatus with a local ID of the linkage destination apparatus where a failure has occurred.

The output device 205 is a device for performing various outputs accompanying generation of the mapping information. The CD-ROM device 206 is a device for reading out the content of the CD-ROM containing the aforementioned various processing programs. The communication device 207 is a device for performing communication with another processing apparatus via a network such as Internet and Intranet. The mapping table 208 is a table for storing the local ID of the apparatus related to the standard ID.

Moreover, the transaction processing apparatus 101 includes a transaction execution request processor 211, a local ID inquiry processor 212, and a mapping information generation processor 213.

The transaction execution request processor 211 is a processor for relating the local ID "11" for identifying the transaction 11 of the transaction processing apparatus 101 to the standard ID for relating the transaction processing of the transaction processing apparatuses 101 and 102, storing them in the mapping table 208, transmitting the standard ID and the transaction processing request to the transaction processing apparatus 102 to request for execution of the transaction 21 in the transaction processing apparatus 102.

When a failure occurs in the transaction 21 which has requested for the execution, the local ID inquiry processor 212 specifies the standard ID of the transaction 21 and inquires the local ID "21" for identifying the transaction 21. The mapping information generation processor 213 is a processor for generating mapping information for relating the local ID "11" corresponding to the specified standard ID to the transmitted local ID "21".

The program for making the transaction processing apparatus 101 function as the transaction execution request processor 211, the local ID inquiry processor 212, and the mapping information generation processor 213 is recorded on a recording medium such as a CD-ROM, stored on a magnetic disk and then loaded on a memory to be executed. It should be noted that the recording medium for recording the aforementioned program may be a recording medium other than the CD-ROM. Moreover, the aforementioned program may be used by installing it from the recording medium onto an information processing device or by accessing the recording medium via a network.

Figure 3:
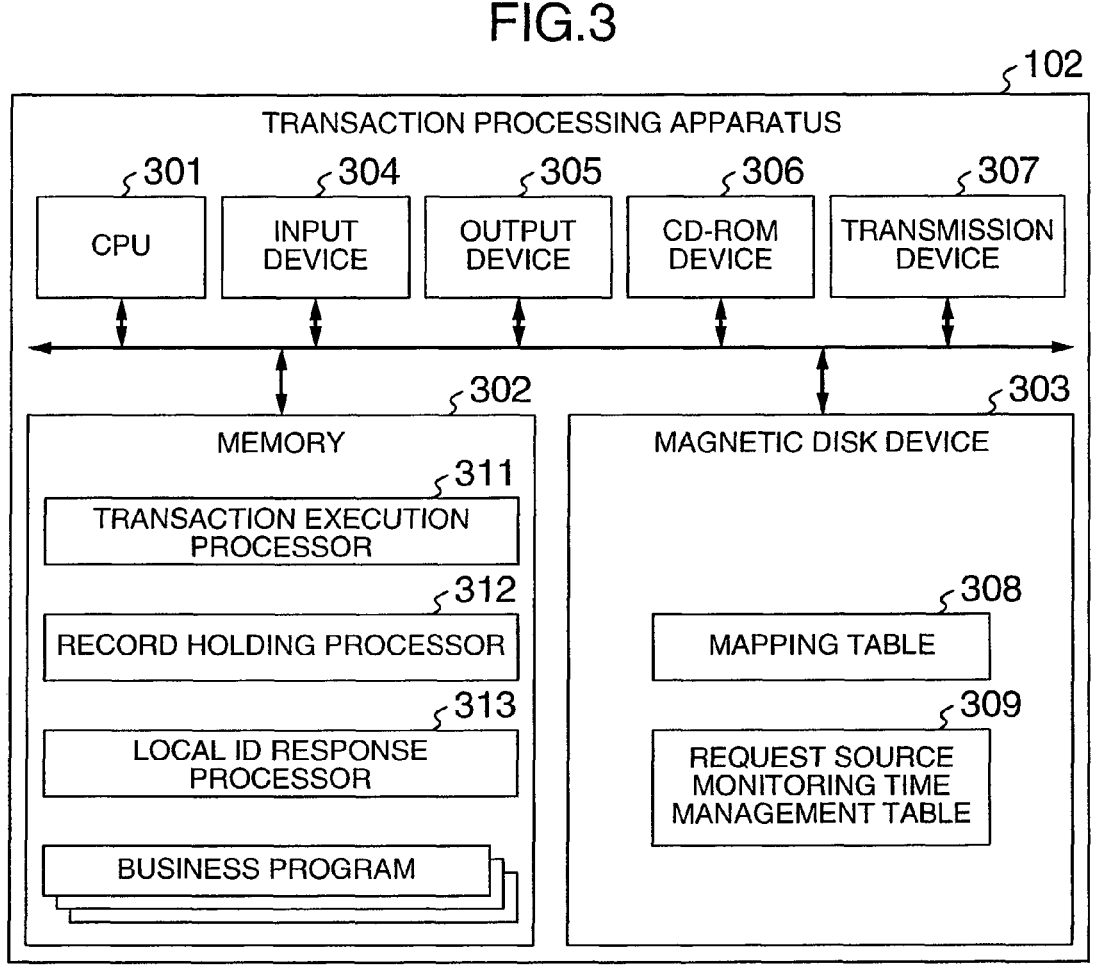
FIG. 3 shows a brief configuration of a transaction processing apparatus 102 according to the present embodiment.

FIG. 3 shows brief configuration of the transaction processing apparatus 102 according to the present embodiment. As shown in FIG. 3, the transaction processing apparatus 102 of the present embodiment includes a CPU 301, a memory 302, a magnetic disk device 303, an input device 304, and output device 305, a CD-ROM device 306, a communication device 307, and a mapping table 308.

The CPU 301 is an apparatus for controlling the operation of the entire transaction processing apparatus 102. The memory 302 is a storage device for loading various processing programs and data used for controlling the operation of the entire transaction processing apparatus 102.

The magnetic disk device 303 is a storage device for storing the aforementioned various processing programs and data. The input device 304 is a device for performing various inputs for maintaining the standard ID and the local ID of the apparatus for a predetermined period of time after a failure has occurred.

The output device 305 is a device for performing various outputs accompanying holding of the standard ID and the local ID. The CD-ROM device 306 is a device for reading out the content of the CD-ROM containing the aforementioned various processing programs. The communication device 307 is a device for performing communication with another processing apparatus via a network such as the Internet and the Intranet.

The mapping table 308 is a table for storing the local ID of the apparatus related to the standard ID. A request origin monitoring time management table 309 is a table for storing time information for deleting the record of the transaction where a failure has occurred from the mapping table 308.

Moreover, the transaction processing apparatus 102 includes a transaction execution processor 311, a record holding processor 312, and a local ID response processor 313.

The transaction execution processor 311 is a processor for receiving the standard ID for relating the transaction processing of the transaction processing apparatuses 101 and 102 and the transaction processing request from the transaction processing apparatus 101, relating the standard ID to the local ID "21" for identifying the transaction 21 of the transaction processing apparatus 102, storing them in the mapping table 308, and executing the requested processing transaction 21.

When a failure occurs in the transaction 21 which has executed, the record holding processor 312 maintains the record in the mapping table 308 relating the standard ID of the transaction 21 to the local ID "21" for a predetermined period of time.

When a query is made with specification of the aforementioned standard ID, the local ID response processor 313 reads the local ID "21" corresponding to the specified standard ID from the mapping table 308 and transmits it to the transaction processing apparatus 101.

The program for making the transaction processing apparatus 102 function as the transaction execution processor 311, the record holding processor 312, and the local ID response processor 313 is recorded on a recording medium such as a CD-ROM, stored on a magnetic disk and then loaded on a memory to be executed. It should be noted that the recording medium for recording the aforementioned program may be a recording medium other than the CD-ROM. Moreover, the aforementioned program may be used by installing it from the recording medium onto an information processing device or by accessing the recording medium via a network.

As shown in FIG. 2 and FIG. 3, this embodiment has been explained for a case that the transaction execution request side and the transaction execution side are realized by information processing devices having different configurations. However, it is also possible to use an information processing device having the configurations of both FIG. 2 and FIG. 3 and capable of requesting another apparatus to execute a transaction and executing a transaction requested from another apparatus.

Figure 4:
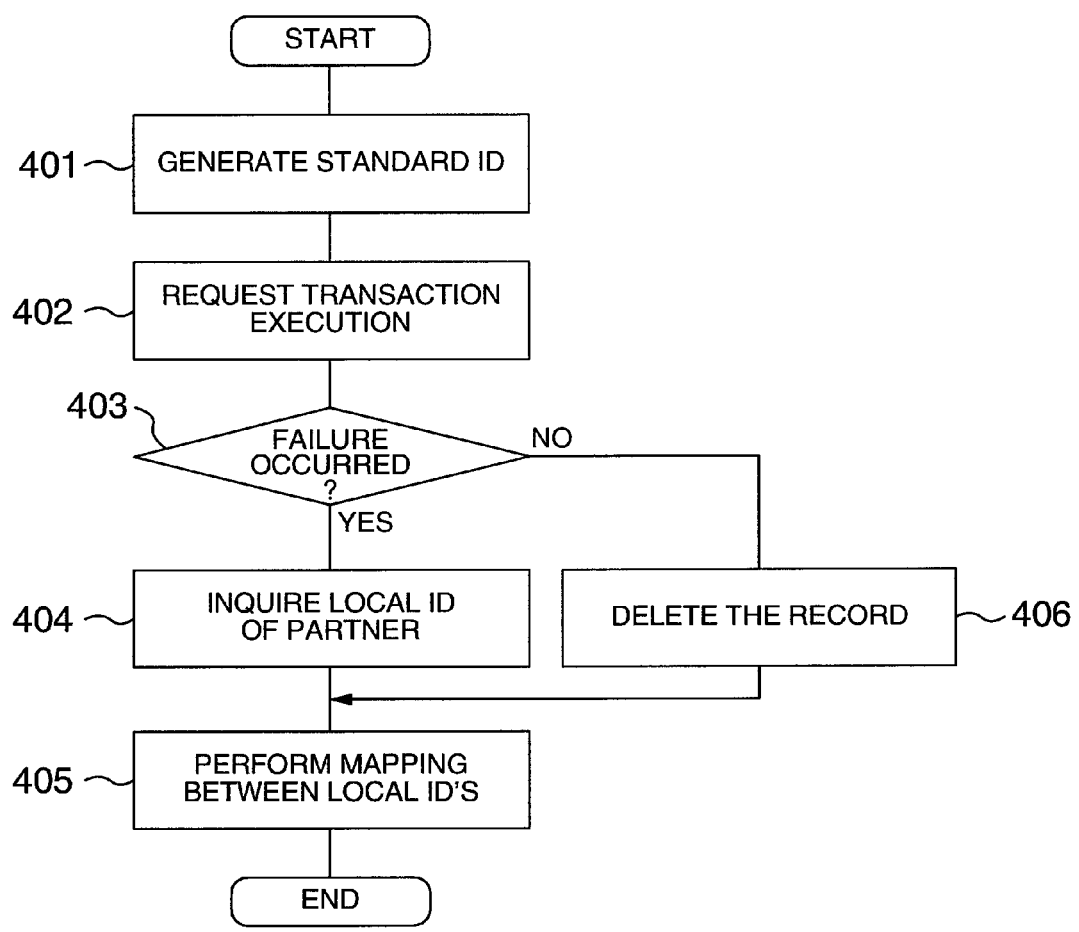
FIG. 4 is a flowchart showing a processing procedure of the processing at the transaction execution requesting side according to the present embodiment.

FIG. 4 is a flowchart showing processing procedure of the processing performed by the transaction execution request side according to the present embodiment. As shown in FIG. 4, when execution of a transaction processing is required in the transaction processing apparatus 102 while performing processing of the transaction 11 started in the transaction processing apparatus 101, in step 401, the transaction execution request processor 211 of the transaction processing apparatus 101 generates a standard ID "A" for relating the transaction processing of the transaction processing apparatuses 101 and 102, relates the local ID "11" for identifying the transaction 11 of the transaction processing apparatus 101 to the standard ID generated, and stores them in the mapping table 208.

As has been described above, there is a case that during a processing of a transaction started in a certain transaction processing apparatus, execution of transaction processing in another transaction processing apparatus is required. This can be seen in the bank online processing system and travel agent online processing system.

Figure 5:
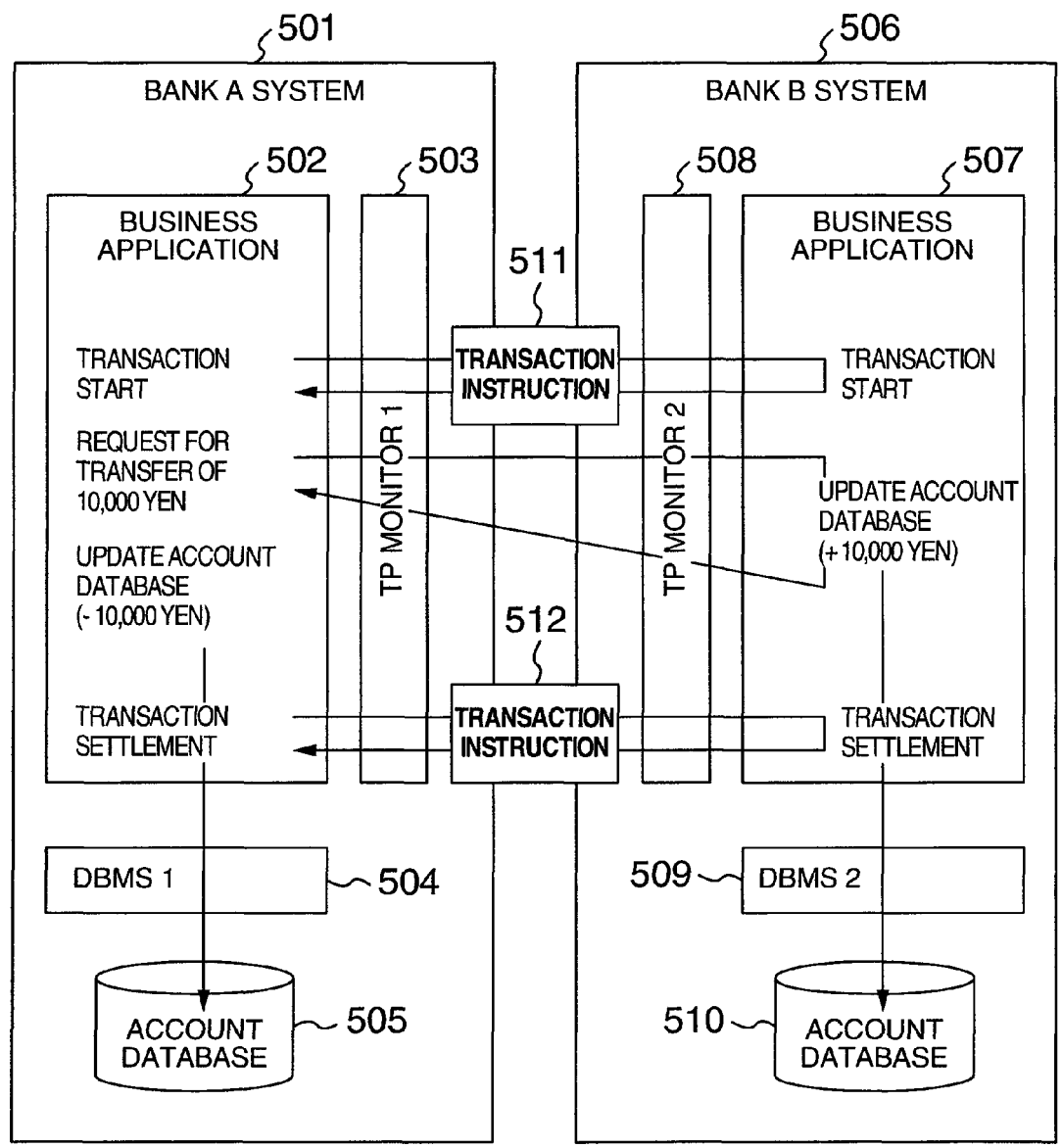
FIG. 5 shows a processing example of a bank online processing system according to the present embodiment.

FIG. 5 shows a processing example of a bank online processing system according to the present embodiment. As shown in FIG. 5, In the A bank system 501, a business application 502 is operating and a TP monitor and a database management system (DBMS) 504 are used. Moreover, in the B bank system 506, a business application 507 is operating and a TP monitor 508 and a DBMS 509 are used. The business application 502 is an application program for requesting a transfer and decreasing a specified money from the account database. The business application 507 is an application program for receiving the transfer request and increasing the specified money in the account database.

These transfer requests are performed via the TP monitor 503 and the TP monitor 508. However, these TP monitors may be of different venders. For this, the transaction instruction 511 for requesting the transaction start and the transaction instruction 512 for requesting settlement of transaction use the standard ID for recognizing each other instead of the local ID used in the TP (transaction processing) monitors. By using this standard ID, it becomes possible to synchronize the transactions in the different TP monitors and perform transfer processing between different banks.

Figure 6:
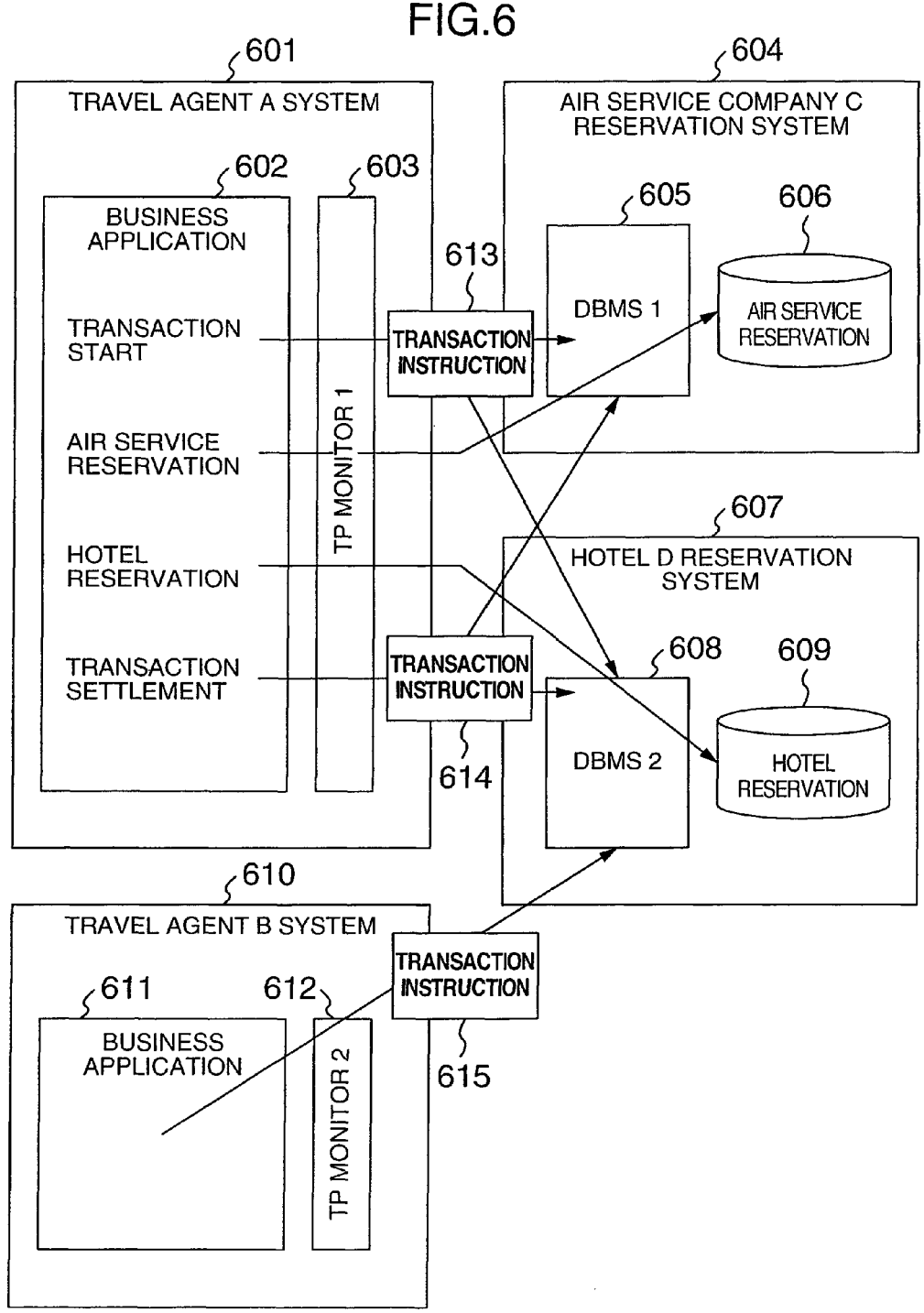
FIG. 6 shows a processing example of a travel agent online processing system according to the present embodiment.

FIG. 6 shows a processing of a travel online processing system as the embodiment. The standard ID defined by the standard protocol is not limited to the processing between the TP monitors in FIG. 5. As shown in FIG. 6, it can also be used between a TP monitor and DBMS.

In the A travel agent system 601, a business application 602 and a TP monitor 603 are operating for management of a transaction. In the C air service company reservation system, a DBMS 605 is operating for management of a reservation database. Moreover, in the D hotel reservation system, a DBMS 608 is operating for management of a reservation database 609.

The business application 602 instructs a transaction start to the DBMS 605 and the DBMS 608 via the TP monitor 603. Next, an air service reservation processing and a hotel reservation processing are performed. Lastly, a transaction settlement is instructed to the DBMS 605 and the DBMS 608 via the TP monitor 603.

Since the business application 602 treats the processing for the respective DBMS's as one transaction, commit settlement is instructed only when both of the air service reservation and the hotel reservation are successful. When one of them or both of them fail, a roll back settlement is performed. Accordingly, there is no case that only one of the reservations is performed.

In this case also, the standard ID is used for instructing a transaction from the TP monitor to the DBMS. The TO monitor 603, the DBMS 605, and the DBMS 608 may be obtained from different vendors if they can handle the standard ID. If the B travel agent system uses the TP monitor 612 using the standard ID, the business application 611 also can participate in this system.

Thus, when linking transactions between different banks, a travel agent, an air service company, a hotel, and the like, the systems used there are usually different and the local ID's used are different. In such a case, the standard ID is used for relating the transactions to be linked in the respective systems.

Figure 7:
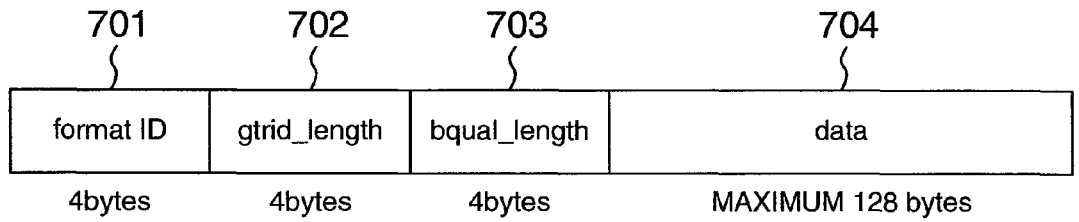
FIG. 7 shows an outline of the standard ID according to the present embodiment.

FIG. 7 shows an outline of the standard ID according to the present embodiment. The standard ID is formatted as is defined in FIG. 7. The standard ID includes a format ID 701 for identifying the format, a global transaction identifier size 702 indicating the size of the global transaction identifier, a branch modifier size 703 indicating the size of the branch modifier, and a data section 704 containing the global transaction identifier and the branch modifier.

The global transaction identifier in this standard ID contains information for identifying the transaction processing apparatus which has made the transaction execution request. By referencing this content, it is possible to identify the transaction processing apparatus which has made the execution request.

Next, in step 402, the transaction execution request processor 211 transmits the generated standard ID and the transaction processing request to the transaction processing apparatus 102 so that the transaction 21 is executed in the transaction processing apparatus 102.

Figure 8:
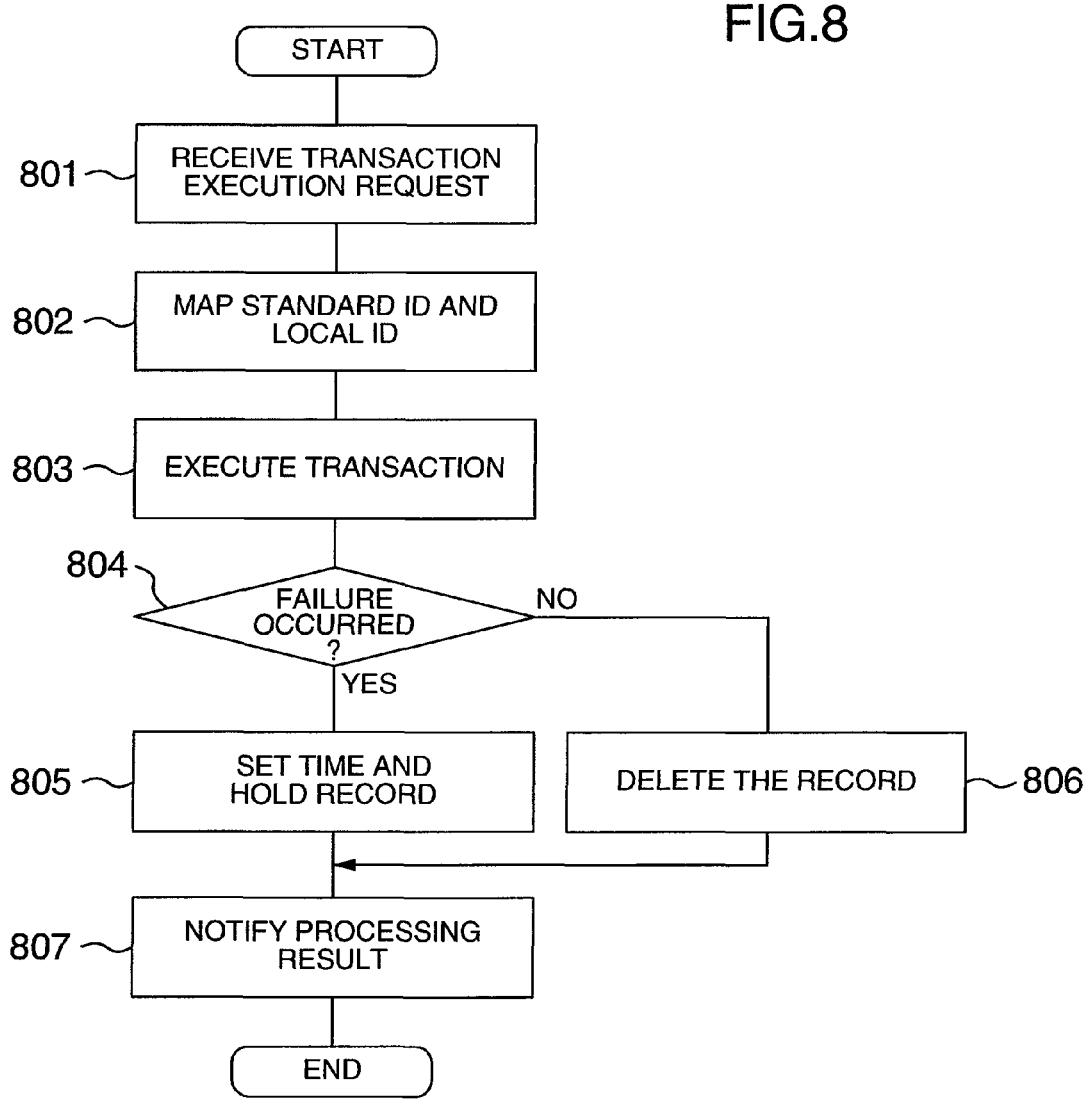
FIG. 8 is a flowchart showing a processing procedure of the processing at the transaction executing side according to the present embodiment.

FIG. 8 is a flowchart showing the processing procedure of the processing performed in the transaction execution side according to the present embodiment. As shown in FIG. 8, in step 801, the transaction execution processor 311 of the transaction processing apparatus 102 receives the aforementioned standard ID and the transaction processing request from the transaction processing apparatus 101 and proceeds to the processing of step 802.

In step 802, the local ID "21" is generated for identifying the transaction 21 started in the transaction processing apparatus 102. After this, the received standard ID "A" is related to the generated local ID "21" and they are stored in the mapping table 308. Moreover, the global transaction identifier is read out from the data section 704 of the received standard ID and the information identifying the transaction processing apparatus of the request source or requester which has transmitted the transaction processing request is read out and stored in the column of the requester in the mapping table 308.

In step 803, execution of the requested transaction 21 is started and the execution state is monitored. Upon detection of the end of the transaction 21 whose execution has been started, control is passed to step 804.

Step 804 checks whether or not the transaction 21 has terminated abnormally by referencing the information indicating the end state of the transaction 21 which has terminated, so as to judge whether any failure has occurred in the transaction 21. If any failure is detected, control is passed to step 805. Otherwise, control is passed to step 806.

In step 805, the record holding processor 312 of the transaction processing apparatus 102 references the mapping table 308, searches mapping table 308 for the record matched with the local ID "21" of the transaction 21 which has been executed, reads out the corresponding standard ID "A", stores information indicating the time of generation of the aforementioned failure in the record where the standard ID "A" is related to the local ID "21", and performs processing to hold the record without deleting it.

On the other hand, step 806 searches the mapping table 308 for the record matched with the local ID "21" of the transaction 21 which has been executed, reads out the corresponding standard ID "A", and deletes the record which relates the standard ID "A" to the local ID "21".

Step 807 generates information indicating the processing result of the transaction 21 which has been executed and notifies it together with the standard ID "A" read out in step 805 or step 806 to the transaction processing apparatus 101.

When the processing result of the transaction 21 is notified from the transaction processing apparatus 102, in step 403 of FIG. 4, the transaction execution request processor 211 of the transaction processing apparatus 101 references the notified processing result to check whether any failure has occurred in the transaction 21 which has made execution request in step 402. If failure has occurred, control is passed to step 404.

In step 404, the local ID inquiry processor 212 specifies the standard ID "A" received together with the processing result and inquires of transaction apparatus 102 the local ID "21" for identifying the transaction 21 where the failure has occurred.

Upon reception of the inquiry with specification of the standard ID "A" from the transaction processing apparatus 101, the local ID response processor 313 of the transaction processing apparatus 102 reads out the local ID "21" corresponding to the specified standard ID "A" from the mapping table 308 and transmits it to the transaction processing apparatus 101.

The transaction processing apparatus 101 receives the local ID of the transaction 21 transmitted from the transaction processing apparatus 102, and in step 405 of FIG. 4, the mapping information generation processor 213 of the apparatus 101 searches the mapping table 208 for the record matched with the specified standard ID "A", reads out the corresponding local ID "11", and relates the local ID "11" to the aforementioned local ID "21" which has been transmitted, thereby generating mapping information.

On the other hand, if the check in step 403 indicates that no failure has occurred in the transaction 21, control is passed to step 406, where the record matched with the standard ID notified together with the processing result is searched from the mapping table and deleted.

Figure 9:
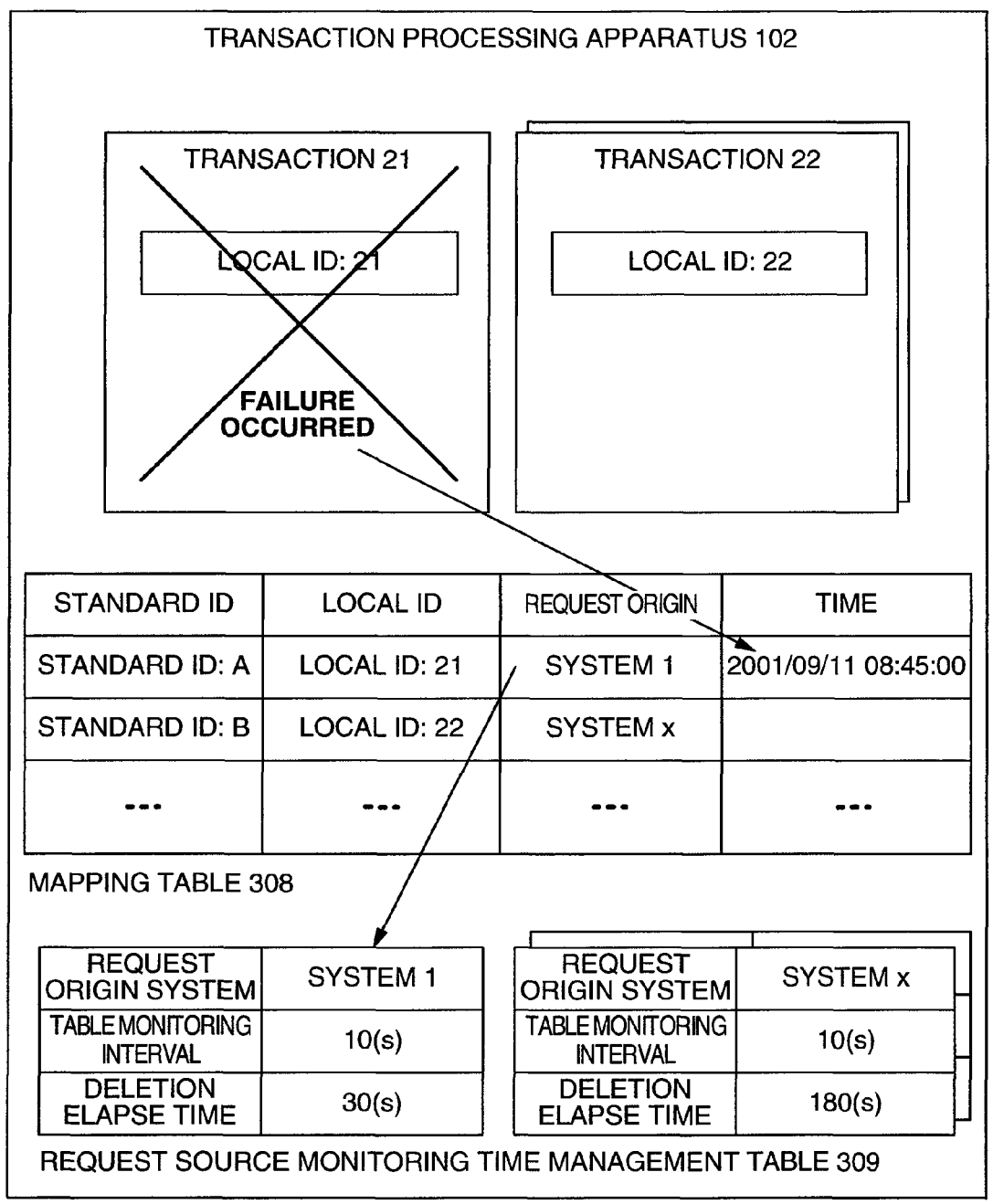
FIG. 9 shows a processing example when a failure has occurred in the transaction 21 according to the present embodiment.

FIG. 9 shows an example of processing performed when a failure has occurred in the transaction 21 of the present embodiment. As shown in FIG. 9, if a failure occurs in the transaction 21 being executed in the transaction processing apparatus 102, the record holding processor 312 of the transaction processing apparatus 102 searches the mapping table 308, stores information on the time of the occurrence of the failure in the column of time in the record matched with the local ID "21" of the transaction 21 having the failure, and holds the record without deleting it until a predetermined deletion time indicated in the request origin monitoring time management table 309 elapses.

The request source monitoring time management table 309 contains the table monitoring interval indicating the time interval for monitoring the table and the deletion elapse time indicating the time which elapses until the record in the mapping table 308 is deleted after a failure occurs. By setting a short time for the deletion elapse time of the system 1 (transaction processing apparatus 101) having the function of the local ID inquiry processor 212 inquiring the local ID when a failure has occurred and a long time for the other system X, it is possible to prevent a case that a plenty of records remain for a long time without being deleted. Moreover, the local ID can also be acquired manually by a manager of the system X having no local ID inquiry function.

Figure 10:
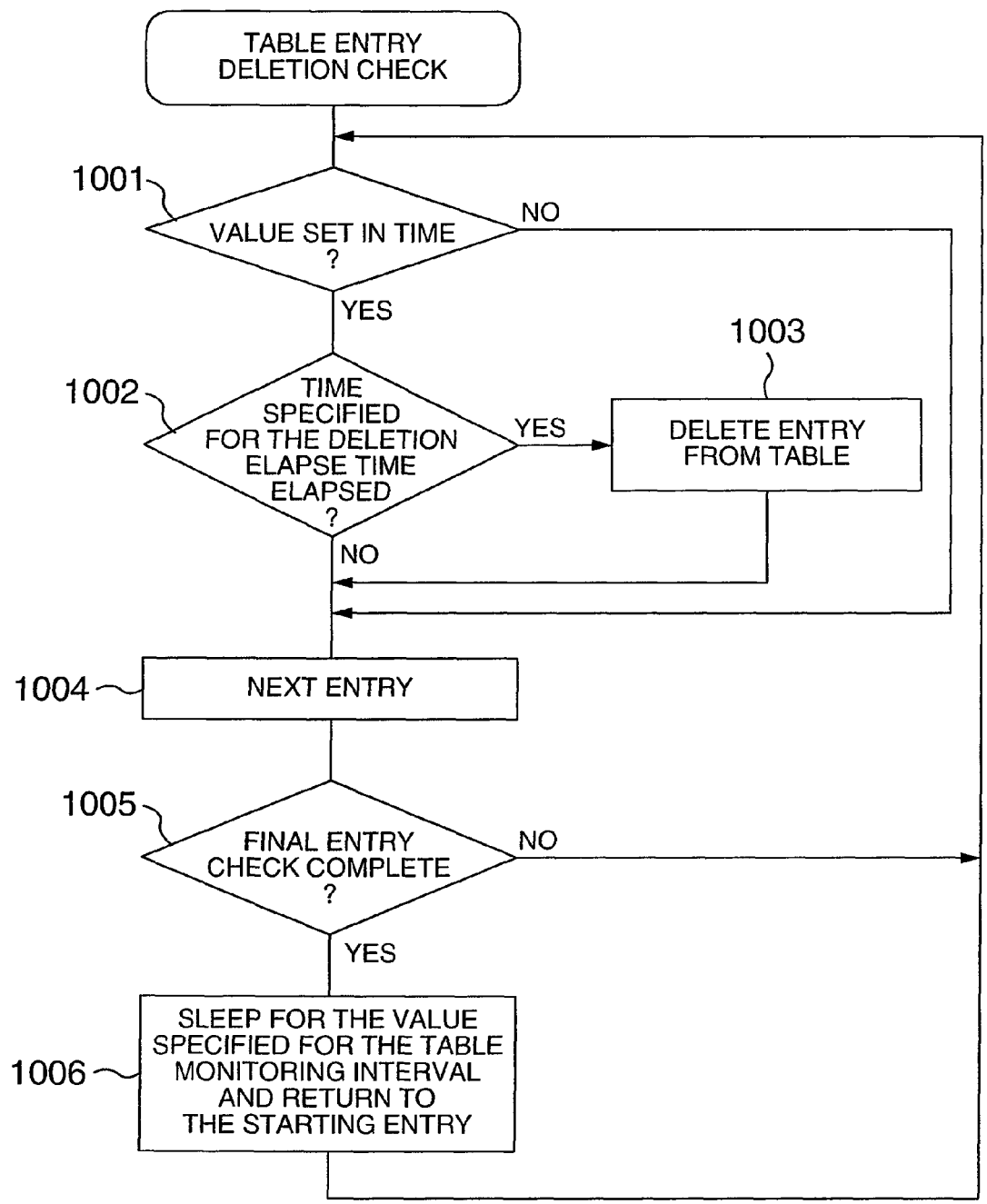
FIG. 10 is a flowchart showing a processing procedure of a table entry deletion check according to the present embodiment.

FIG. 10 is a flowchart showing a processing procedure of the table entry deletion check according to the present embodiment. As shown in FIG. 10, the record holding processor 312 of the transaction processing apparatus 102 monitors the records in the mapping table 308 according to the information on the request source monitoring time management table 309 and delete the record whose deletion elapse time has elapsed after a failure occurred.

That is, in step 1001, the record holding processor 312 references the record on the mapping table and checks whether a value is stored in the column of time. If a value is stored, control is passed to step 1002. Otherwise, control is passed to step 1004.

Step 1002 reads out the request source in the record referenced in step 1001, references the request source monitoring time management table 309 and reads out the table monitoring interval and the deletion elapse time corresponding to the request source read out. It is checked whether the time indicated by the deletion elapse time has elapsed from the time in the record. If the time has elapsed, control is passed to step 1003 and the record is deleted from the mapping table.

After this, in step 1004, the record of the next entry is read out from the mapping table 308 and step 1005 checks whether check has been complete up to the final entry. If the check is complete, control is passed to step 1006. Otherwise, control is returned to step 1001 for processing the next entry.

Step 1006 performs sleep processing for the value specified for the table monitoring interval read out in step 1002 and control is returned to step 1001 for processing the first entry and after.

Figure 11:
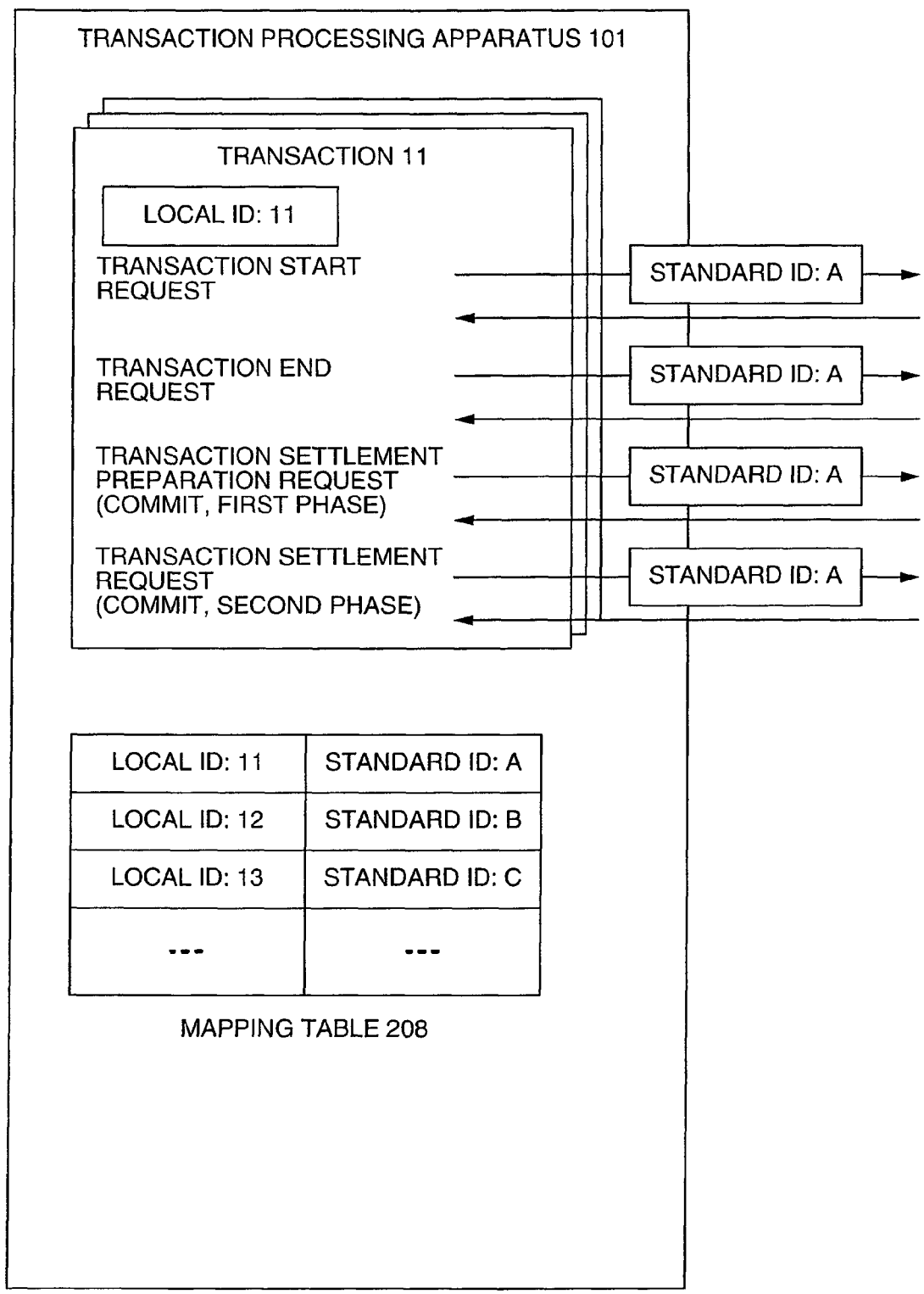
FIG. 11 shows an outline of creation of the mapping table 208 in the transaction processing apparatus 101 according to the present embodiment.

FIG. 11 shows an outline of creation of the mapping table 208 in the transaction processing apparatus 101 of the present embodiment. As shown in FIG. 11, if there arises a need of performing a transaction processing in the transaction processing apparatus 102 during processing of a plurality of transactions including transaction 11, the transaction processing apparatus 101 relates the local ID "11" to local ID 13 to the standard ID "A" to standard ID "B", stores them in the mapping table 208, and transmits a transaction start request or the like so as to request the transaction processing apparatus 102 to execute a transaction.

Figure 12:
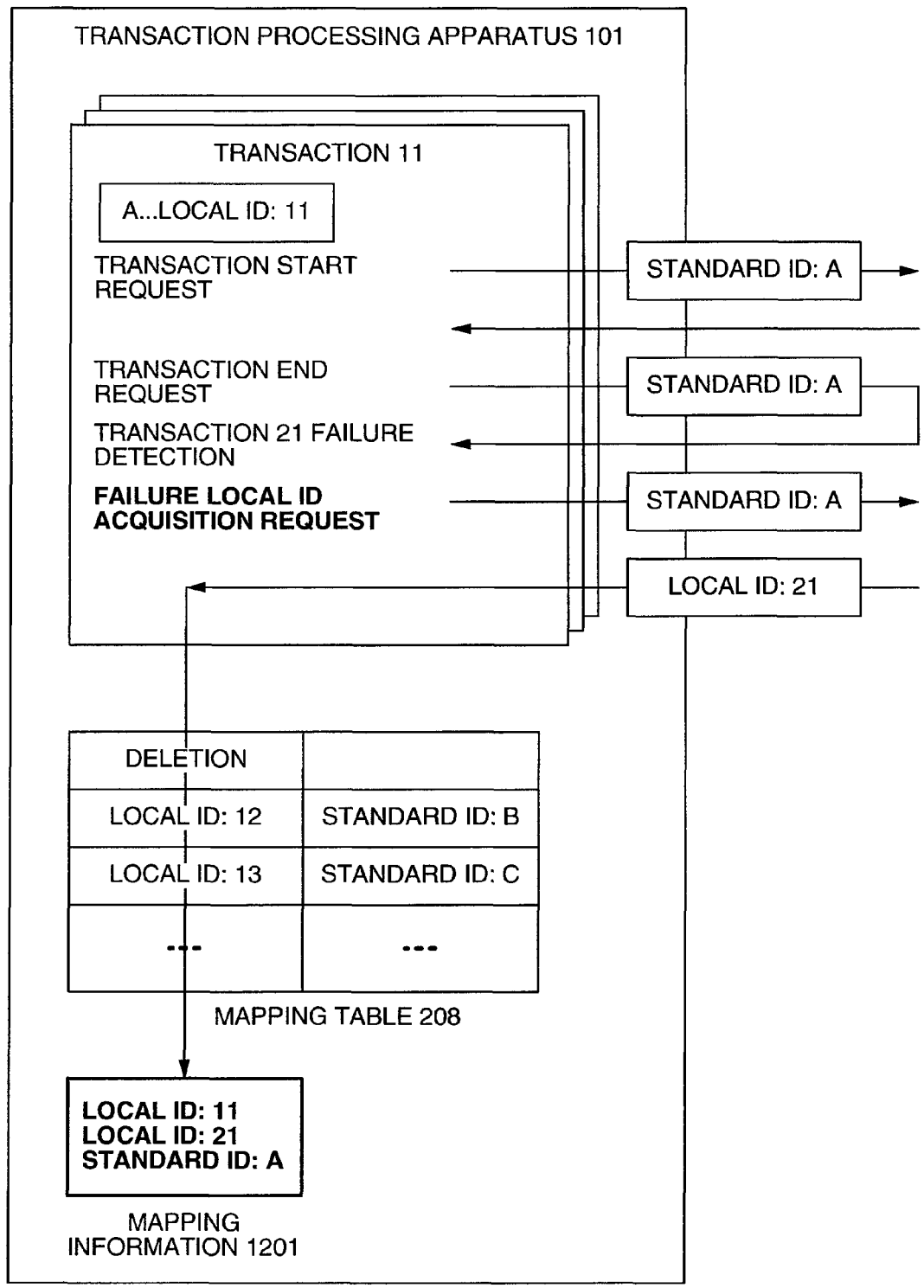
FIG. 12 shows an outline of creation of the mapping information between the local ID "11" and the local ID "21" according to the present embodiment.

FIG. 12 shows an outline of creation of mapping information of the local ID "11" and the local ID "21" according to the present embodiment. As shown in FIG. 12, upon detection of a failure of the transaction 21, the transaction processing apparatus 101 specifies the standard ID "A", requests to acquire the local ID of the transaction 21, acquires the local ID "21", and creates the mapping information 1201.

After this, when investigating the failure which has occurred during linkage of the aforementioned transaction, failure information on the transaction processing apparatus 101 is collected by using the local ID "11" and then failure information on the transaction processing apparatus 102 is collected by using the local ID "21" related to the local ID "11" in the mapping information 1201, thereby eliminating the investigation of the standard ID to reduce the time of failure investigation. Moreover, since the mapping information 1201 relates the local ID "11" to the local ID "21", it is possible to eliminate the matching work between the local ID's which requires great energy.

Moreover, when the transaction processing apparatus 101 performs a request for acquiring the local ID of the transaction 21 by specifying the standard ID "A", it is possible to acquire the information on the pointer indicating the storage position of the failure information on the transaction processing apparatus 102, store it in the mapping information, collect failure information on the transaction processing apparatus 101 by using the local ID "11", collect the failure information on the transaction processing apparatus 102 online by using the pointer of the local ID "21", and display the failure information on each system according to the time series of transaction linkage, thereby supporting the failure investigation.

As has been described above, according to the transaction processing system of the present embodiment, if a failure occurs during linkage of transaction processing, the standard ID and the local ID are maintained for a predetermined period of time and mapping information is created by relating the local ID's between the information processing apparatuses. Accordingly, it is possible to reduce the time required for investigating a failure which has occurred in a transaction processing conducted between a plurality of information processing apparatuses.

According to the present invention, if a failure occurs during linkage of transaction processing, it is possible to reduce the time required for investigating the failure which has occurred in the transaction processing conducted between a plurality of information processing apparatuses.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of processing a transaction in a system wherein at least first and second information processing devices are linked to perform transaction processings and utilize standard identifiers (IDs) for identifying related transaction processings, the method comprising steps of:

generating a standard ID for processing of the transaction in the first information processing device;

storing in a mapping table in each of the first and second information processing devices to be involved in the processing of the transaction, each of the mapping tables holding a record for the processing of the transaction for a predetermined period of time and a local ID for processing the transaction in each of the first and second information processing devices, each of the local IDs corresponding to the standard ID for processing the transaction;

sending an inquiry from the first information processing device to the second information processing device, the inquiry using the standard ID to identify the processing of the transaction;

receiving from the second information processing device, the local ID for processing the transaction of the second information processing device; and relating the received local ID for processing the transaction of the second information processing device with a respective local ID for processing the transaction of the first information processing device which has sent the inquiry, wherein a value of the predetermined period of time for holding said record is modified depending upon whether the information processing device which makes a transaction processing request is the first information processing device which has sent the inquiry.

2. The method of transaction processing as in claim 1, wherein a failure in the processing of the transaction occurs in the second information processing device.

3. A product for use in a transaction system wherein at least first and second information processing devices are linked to perform transaction processings and utilize standard identifiers (IDs) for identifying related transaction processings, the product comprising a non-transitory computer readable storage medium having computer-executable instructions stored therein for causing one or more of the information processing devices to perform steps of:

generating a standard ID for processing of the transaction in the first information processing device;

storing in a mapping table in each of the first and second information processing devices to be involved in the processing of the transaction, each of the mapping tables holding a record for the processing of the transaction for a predetermined period of time and a local ID for processing the transaction in each of the first and second information processing devices, each of the local IDs corresponding to the standard ID for processing the transaction;

sending an inquiry from the first information processing device to the second information processing device, the inquiry using the standard ID to identify the processing of the transaction;

receiving from the second information processing device, the local ID for processing the transaction of the second information processing device; and relating the received local ID for processing the transaction of the second information processing device with a respective local ID for processing the transaction of the first information processing device which has sent the inquiry, wherein a value of the predetermined period of time for holding said record is modified depending upon whether the information processing device which makes a transaction processing request is the information processing device which has sent the inquiry.

4. The product of claim 3, wherein a failure in the processing of the transaction occurs in the second information processing device.

5. A system for processing transactions in a plurality of information processing devices that are linked with each other, the system comprising:

(a) a first information processing device to request a transaction processing including:
(a1) a unit configured to generate a standard identifier (ID) for processing of the transaction;
(a2) a unit configured to generate and store a first local ID correlated to the standard ID in a first mapping table; and
(a3) a unit configured to send the standard ID and a transaction processing request;

(b) a second information processing device to perform the requested transaction processing including:
(b1) a unit configured to receive the standard ID and the transaction processing request; and
(b2) a unit configured to generate and store a second local ID corresponding to the requested transaction processing, the second local ID correlated to the standard ID being stored in a second mapping table, wherein:

an inquiry is sent to the second information processing device for identifying the processing the transaction using the standard ID, the second local ID is sent to the first information processing device, the first information processing device reads out the first local ID corresponding to the standard ID based on the second local ID from the first mapping table and relates the second local ID with the retrieved first local ID, and a value of the predetermined period of time for holding said record is modified depending upon whether the first information processing device is the information processing device which makes the inquiry.

6. The system of claim 5, wherein the second information processing device checks an existence of failure in the requested transaction processing by reading out the second local ID corresponding to the standard ID stored in the second mapping table, and sends the second local ID to the first information processing device when the failure in the requested transaction processing exists.

* * * * *